(12) United States Patent
Powell et al.

(10) Patent No.: US 9,876,972 B1
(45) Date of Patent: Jan. 23, 2018

(54) MULTIPLE MODE AND MULTIPLE WAVEBAND DETECTOR SYSTEMS AND METHODS

(71) Applicant: Lockheed Martin Corporation, Bethesda, MD (US)

(72) Inventors: Calvin L. Powell, Orlando, FL (US); Trisha A. Fish, Merritt Island, FL (US); Mark T. Myers, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 192 days.

(21) Appl. No.: 14/471,656

(22) Filed: Aug. 28, 2014

(51) Int. Cl.
*H04N 5/372* (2011.01)
*H04N 5/33* (2006.01)
*G06K 9/46* (2006.01)

(52) U.S. Cl.
CPC .......... *H04N 5/37213* (2013.01); *G06K 9/46* (2013.01); *H04N 5/33* (2013.01); *G06K 2009/4666* (2013.01)

(58) Field of Classification Search
CPC .. H04N 5/23245; H04N 5/2257; H04N 5/257; H04N 5/378
USPC ................................................ 348/294, 295
See application file for complete search history.

(56) References Cited

U.S. PATENT DOCUMENTS

| 4,767,937 | A | 8/1988 | Norsworthy |
| 8,463,078 | B2 | 6/2013 | Goodnough et al. |
| 8,937,639 | B2 | 1/2015 | Kasunic et al. |
| 2006/0181483 | A1* | 8/2006 | Ari .......................... F41G 3/225 345/8 |
| 2007/0058717 | A1 | 3/2007 | Chosak et al. |
| 2007/0222981 | A1* | 9/2007 | Ponsardin ................. G01J 3/02 356/301 |
| 2008/0025462 | A1 | 1/2008 | Sutko et al. |
| 2009/0231598 | A1* | 9/2009 | Kimura ................. G06T 3/4007 358/1.2 |
| 2010/0046853 | A1* | 2/2010 | Goodnough ....... H04N 5/37206 382/275 |
| 2012/0075513 | A1* | 3/2012 | Chipman ................. G01J 4/04 348/302 |

(Continued)

OTHER PUBLICATIONS

Author Unknown, "Digital Focal-Plane Arrays," Tech Notes, MIT Lincoln Laboratory, 2010, retrieved from http://www.ll.mit.edu/publications/technotes/TechNote_DFPA.pdf, 2 pages.
Author Unknown, "Staring array," Wikipedia, version modified Jan. 28, 2013, retrieved from http://en.wikipedia.org/w/index.php?title=Staring_array&oldid=535312116, 2 pages.
Brown, Matthew G. et al., "Digital-pixel Focal Plane Array Development," Quantum Sensing and Nanophotonic Devices VII, Proceedings of SPIE, vol. 7608, 2010, SPIE, 10 pages.

(Continued)

*Primary Examiner* — Antoinette Spinks
(74) *Attorney, Agent, or Firm* — Withrow & Terranova, PLLC

(57) ABSTRACT

Multiple mode, multiple waveband detector systems and methods are provided. A first window selection signal is received. Based on the first window selection signal, a first read-out pixel window comprising a first subset of pixels of a plurality of pixels of a detector array is determined. A plurality of first image portions of a scene are generated over a first period of time by iteratively, for each iteration of a plurality of iterations over the first period of time, integrating photons on the detector array, reading out only the first subset of pixels in the first read-out pixel window, and storing a first image portion of the scene of the plurality of first image portions of the scene based on the read-out of the first subset of pixels.

14 Claims, 12 Drawing Sheets

(56) References Cited

U.S. PATENT DOCUMENTS

2015/0215536 A1* 7/2015 Buell ................ H04N 5/23245
348/294

OTHER PUBLICATIONS

Christensen, Philip R. et al., "The Thermal Emission Imaging System (THEMIS) for the Mars 2001 Odyssey Mission," Space Science Reviews, vol. 110, 2004, Kluwer Academic Publishers, pp. 85-130.

Kelly, Michael W. et al., "Advances in Detectors: Digital-pixel FPAs enhance infrared imaging capabilities," LaserFocusWorld, vol. 49, Issue 1, Jan. 1, 2013, PennWell Corporation, 7 pages.

Tyrrell, Brian et al., "Time Delay Integration and In-Pixel Spatiotemporal Filtering Using a Nanoscale Digital CMOS Focal Plane Readout," IEEE Transactions on Electron Devices, vol. 56, No. 11, Nov. 2009, IEEE, pp. 2516-2523.

Notice of Allowance and Examiner-Initiated Interview Summary for U.S. Appl. No. 14/263,145, dated Dec. 4, 2015, 10 pages.

Non-Final Office Action for U.S. Appl. No. 14/120,147, dated Apr. 22, 2016, 18 pages.

Notice of Allowance for U.S. Appl. No. 14/120,147, dated Feb. 15, 2017, 9 pages.

Final Office Action and Applicant Initiated Interview Summary for U.S. Appl. No. 14/120,147, dated Nov. 17, 2016, 24 pages.

U.S. Appl. No. 14/120,147, filed Apr. 30, 2014.

U.S. Appl. No. 14/263,145, filed Apr. 28, 2014.

\* cited by examiner

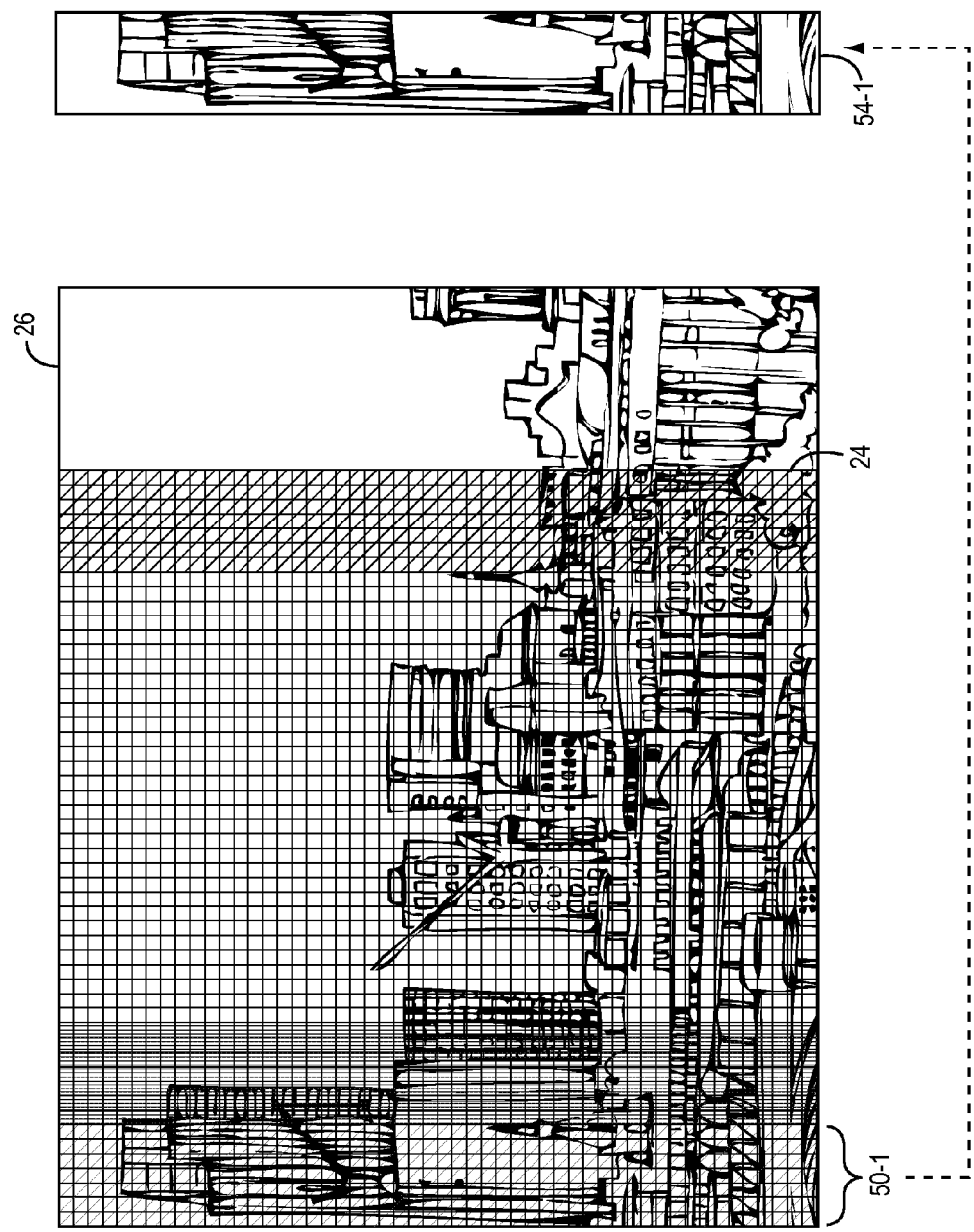

MULTIPLE MODE AND MULTIPLE WAVEBAND DETECTOR SYSTEMS AND METHODS

TECHNICAL FIELD

The embodiments relate generally to detector arrays and, in particular, to multiple mode and/or multiple waveband detector systems and methods.

BACKGROUND

Electronic sensing of an environment is useful in many contexts, including security, targeting adversaries, detecting things in the environment, providing imagery that depicts the environment, and the like. Electronic sensing may be particularly important when the information collected, such as electromagnetic radiation (EMR) in non-visible spectrums, cannot be seen by an unaided human eye. In some contexts, such as in an aircraft for example, it may also be desirable to collect information about the environment relatively rapidly, and in a continuous manner across a large field of regard, to ensure that the crew can be made aware of relevant events that may occur from any direction with respect to the aircraft, such as the approach of an enemy combatant, the launch of an anti-aircraft missile, the movements on the ground of combatants, and the like.

Information about the environment sensed in one waveband may provide information that is not ascertainable in other wavebands. For example, the signature of a missile plume may be particularly energetic in a particular infrared waveband, and less energetic in other infrared and visible wavebands. Thus, for early detection, it would be desirable to have a detector array limited to that particular infrared waveband. However, detectors are typically relatively broadband devices, capture EMR in a relatively wide range of wavebands, and, thus, lack the desired sensitivity in particular wavebands. The use of multiple detectors, each of which may be limited to a relatively narrow waveband, may not be practical in view of cost and size constraints. Generally, there are two types of detectors: scanning detectors and staring detectors, and each type offers advantages in different situations. A scanning detector is typically an array of pixels that has a relatively large number of rows with respect to the number of columns. The scanning detector is scanned across a scene in a direction perpendicular to the long dimension of the pixel array, and the trailing column of pixels may be continually read out at a rate based on the sweep rate of the detector. Because of the relatively small number of pixels read out at one time, the scanning detector may be scanned across the scene relatively quickly. The use of time delay and integration (TDI) processing in conjunction with a scanning detector results in relatively high sensitivity, but a scanning detector remains in motion continually, thus inhibiting the ability to collect additional information from an area deemed to be interesting during a single integration period. A staring detector is typically an array of pixels that has approximately an equal number of columns and rows. The staring detector generates a complete image of the portion of the scene within the field of view (FOV) of the staring detector at a given point in time, but read-out of the entire pixel array takes an amount of time that inhibits a high read-out framerate, and thus the staring detector is moved, if at all, at a relatively slow rate with respect to the scene. However, a staring detector allows for substantial integration times compared to a scanning detector, and thus allows more information to be derived from a scene.

Consequently, it may be desirable in many applications to have both a scanning detector and a staring detector. However, as mentioned above, the use of multiple detectors may not be practical in view of cost and size constraints of the particular application.

SUMMARY

The embodiments provide a multiple mode and multiple waveband detector system that implements selective waveband collection on the same detector array, selective mode operation on the same detector array, or selective waveband and selective mode operation on the same detector array. Thus, the embodiments facilitate mode selection, such as a continuous scan mode or a stare mode, and waveband selection, such that electromagnetic radiation (EMR) in different desired wavebands can be collected, and/or such that broadband EMR can be collected, with any desired combination of both waveband selection and mode selection. The embodiments eliminate the need to have multiple different detector arrays for different desired wavebands, and eliminate the need to have separate scanning and staring detectors.

In one embodiment, a method is provided. A first window selection signal is received. Based on the first window selection signal, a first read-out pixel window comprising a first subset of pixels of a plurality of pixels of a detector array is determined. A plurality of first image portions of a scene are generated over a first period of time by iteratively, for each iteration of a plurality of iterations over the first period of time, integrating photons on the detector array, reading out only the first subset of pixels in the first read-out pixel window, and storing a first image portion of the scene of the plurality of first image portions of the scene based on the read-out of the first subset of pixels.

In one embodiment, based on a first number of pixels in the first read-out pixel window, a framerate is determined, and the plurality of first image portions are generated at the framerate.

In one embodiment, the detector array may be operated in a scan mode or a stare mode.

In another embodiment, a system is provided. The system includes a detector array that includes a plurality of pixels, a sweep device configured to move the detector array with respect to a scene, and a system controller coupled to the detector array and the sweep device. The system controller is configured to determine a selectable operating mode that comprises one of a scan mode and a stare mode, and, in the stare mode, generate a plurality of images of the scene at a first read-out framerate. In the scan mode, the system controller is configured to determine a first read-out pixel window comprising a first subset of pixels of the plurality of pixels of the detector array, continuously move the detector array with respect to the scene, and read out the first read-out pixel window at a second read-out framerate that is a higher read-out framerate than the first read-out framerate.

In another embodiment, another method is provided. The method includes determining a selectable stare mode of a multi-modal system comprising a detector array comprising a plurality of pixels. The multi-modal system comprises a stare operating mode and a scan operating mode. In the stare operating mode, a plurality of images of a scene is generated at a first read-out framerate. In the scan operating mode, a first read-out pixel window comprising a first subset of pixels of the plurality of pixels of the detector array is determined. The detector array is moved continuously with respect to the scene, the first read-out pixel window is read out at a second read-out framerate that is a higher read-out framerate than the first read-out framerate.

In yet another embodiment, another system is provided. The system includes a detector array that comprises a plurality of pixels. A waveband layer is disposed adjacent to the detector array, and is configured to associate each of a plurality of different wavebands with corresponding subsets of pixels of the plurality of pixels. A control system is coupled to the detector array and, in conjunction with the detector array, is configured to receive a window selection signal. Based on the window selection signal, a first read-out pixel window comprising a first subset of pixels of the plurality of pixels of the detector array is determined. A plurality of first waveband image portions of a scene is generated over a first period of time. The first waveband image portions may be generated iteratively, by, for each iteration of a plurality of iterations over the first period of time, integrating photons on the detector array, reading out only the first subset of pixels, and storing a first waveband image portion of the plurality of first waveband image portions of the scene based on the read-out of the subset of pixels.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 5A-5D illustrate the detector array being operated in a continuous scan mode for a period of time according to one embodiment;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts or functional sequence diagrams discussed herein are necessarily discussed in some order or sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first image portions" and "second image portions," and does not imply a priority, a type, an importance, or other attribute, unless otherwise stated herein. The term "about" used herein in conjunction with a numeric value means any value that is within a range of ten percent greater than or ten percent less than the numeric value.

Among other features, the embodiments provide a multiple mode and multiple waveband system that implements selective waveband collection on the same detector array, selective mode operation on the same detector array, or selective waveband and selective mode operation on the same detector array. Thus, the embodiments facilitate mode selection, such as a scan mode or a stare mode, and waveband selection, such that electromagnetic radiation (EMR) in different desired wavebands can be collected, and/or such that broadband EMR can be collected, with any desired combination of both waveband selection and mode selection. The embodiments eliminate the need to have multiple different detector arrays for different desired wavebands, and eliminate the need to have separate scanning and staring detectors.

Figure 1:
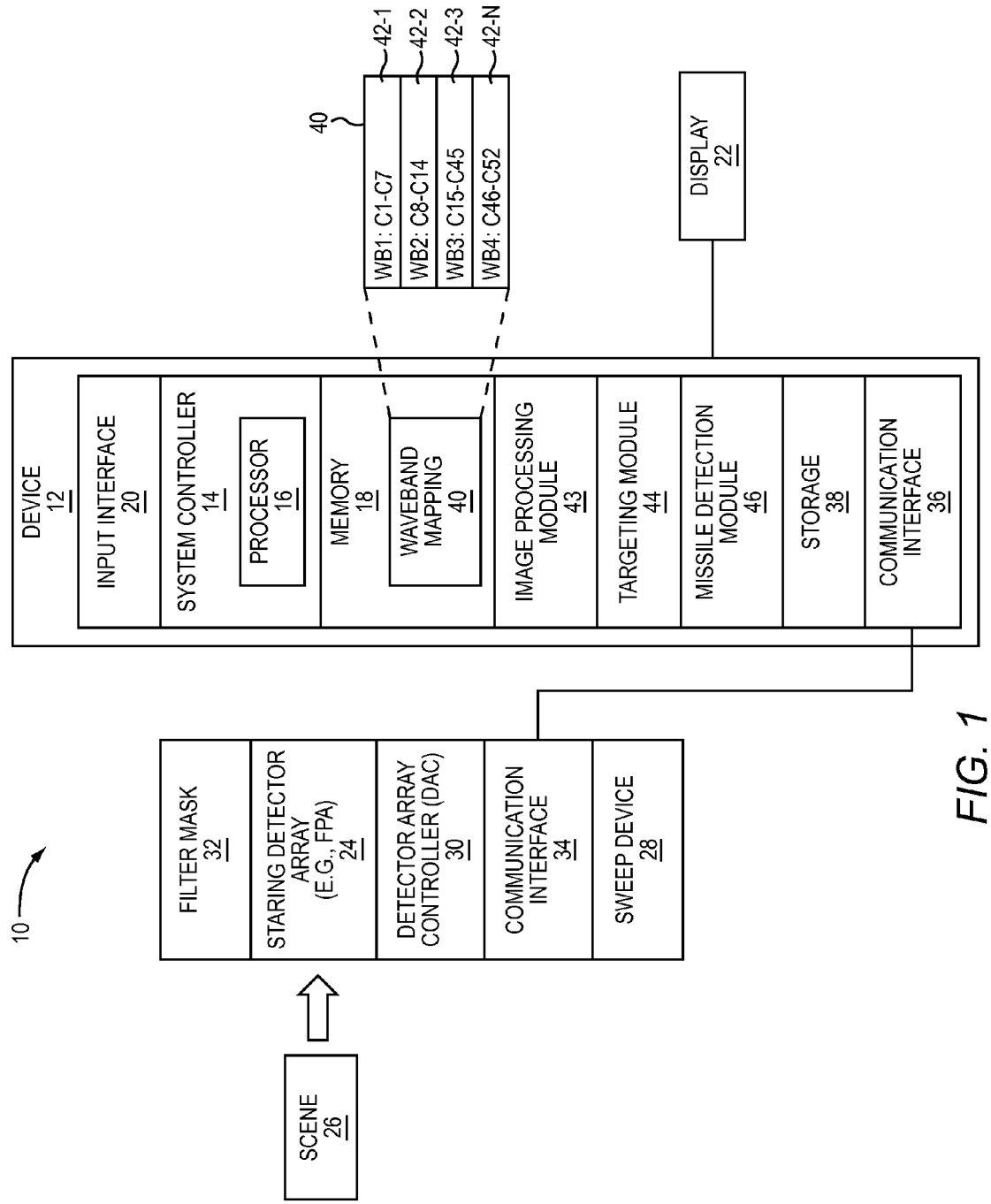
FIG. 1 is a block diagram of a system according to one embodiment.

FIG. 1 is a block diagram of a system 10 according to one embodiment. In operation, the system 10 may be implemented in any number of different applications, such as in conjunction with airborne vehicles, such as airplanes, helicopters, missiles and the like; in conjunction with ground-based mobile applications, such as cars, trucks, personnel carriers, tanks, and the like; or in conjunction with static applications, such as a fixed detection system.

The system 10 includes various components and elements that provide functionality, as described in detail herein, that may be packaged in any of a variety of different manners, such as on one or more printed circuit boards, or in one or more separate physical devices. Thus, while for purposes of illustration the system 10 will be discussed as comprising a particular number of physical devices, the components and functionality illustrated as being part of the system 10 may be apportioned and packaged in any desired manner depending on a particular application, and the embodiments are not limited to any particular physical device packaging.

In one embodiment, the system 10 includes a device 12. The device 12 includes a system controller 14, which provides various control and coordination functionalities, as described in greater detail herein. The system controller 14 may include a processor 16 and operate in conjunction with a memory 18 to provide some or all of the functionality described herein. The system controller 14 may be referred to herein as a control system. The device 12 may also include an input interface 20 that is configured to receive input from a user, such as an operator of the system 10. The input interface 20 may comprise any suitable mechanism for receiving selections from the user, including, by way of non-limiting example, a voice recognition module, or an input mechanism used in conjunction with a display 22, such as a mouse, a keyboard, or the like. In some embodiments, the display 22 may include a touch-sensitive surface, and thus, the input interface may be integrated with the display 22.

The device 12 is in communication with a staring detector array 24. The detector array 24 comprises a plurality of pixels that are sensitive to photons in a range of wavelengths of interest. By way of non-limiting example, the pixels may be sensitive to a range of wavelengths in the visible spectrum, the short-wave infrared (SWIR) spectrum, the mid-wave infrared (MWIR) spectrum, the long-wave infrared (LWIR) spectrum, the ultraviolet (UV) spectrum, or a combination thereof. The detector array 24 may comprise any suitable technology, such as a digital focal plane array (DFPA), a complementary metal-oxide-semiconductor (CMOS) detector array, a charge-coupled device (CCD) detector array, or the like. In some embodiments, the detector array 24 comprises a matrix of pixels that has substantially the same number of columns as rows. For example, the detector array 24 may comprise a 1024 by 1024 matrix of pixels, or a 256 by 256 matrix of pixels.

The detector array 24 quantifies photons received by the pixels from a scene 26 via photon accumulation values. The photon accumulation values may comprise any mechanism suitable for quantifying photons collected over a period of time, sometimes referred to as an integration period of time. In some embodiments, the photon accumulation values may be amounts of electric charge. In other embodiments, the photon accumulation values may be numeric values. In one embodiment, the detector array 24 comprises a DFPA wherein each pixel has corresponding circuitry that is configured to quantify photons received by the pixel over a period of time and output a numeric value corresponding to such received photons.

The detector array 24 may be coupled to a sweep device 28, which may comprise, by way of non-limiting example, a gimbal, or a scan mirror. The sweep device 28 scans the scene 26 with the detector array 24 within a field of regard (FOR) of the sweep device 28. In one embodiment, the sweep device 28 scans the scene 26 with the detector array 24 by physically moving the detector array 24 in a desired direction across the scene 26. In another embodiment, the sweep device 28 scans the scene 26 with the detector array 24 by moving a reflection of the scene 26 with respect to the detector array 24, such as by reflecting, by a scan mirror, the scene 26 across the detector array 24. Thus, while for purposes of illustration, the sweep device 28 may be discussed as moving the detector array 24 across the scene 26 to scan the scene 26, the embodiments are equally applicable to sweep devices 28 which essentially move the scene 26, such as by a scan mirror, across the detector array 24 at a sweep rate.

In some embodiments, the sweep device 28 may operate the detector array 24 in either of several different operating modes. In some embodiments, the operating mode is selectable, either by an operator, or by the system based on operator input, or based on other criteria. A first operating mode is a scan operating mode, sometimes referred to herein as a continuous scan mode or a scan mode, wherein the scene 26 is scanned with the detector array 24 in a continuous manner over a period of time. A second operating mode is a stare operating mode or a stare mode, wherein the scene 26 is scanned with the detector array 24 in a stepped motion, such that the sweep device 28 iteratively moves the scene 26 to a particular location with respect to the detector array 24, stops, allows the detector array 24 to integrate photons for a period of time, then moves the scene 26 to an adjacent location with respect to the detector array 24, stops, and allows the detector array 24 to integrate photons for the period of time. The stare mode may also be used without stepping, such that the scene 26 is fixed at a particular location with respect to the detector array 24, and maintained for a period of time until, for example, additional instructions, such as by an operator, are received.

The detector array 24 may include a detector array controller (DAC) 30 that is configured to implement functionality with respect to the detector array 24, including in response to signals from the system controller 14. While the DAC 30 is illustrated as a single entity for purposes of illustration, the functionality described herein may include multiple different circuits, such as read-out circuitry tightly coupled or integrated with the detector array 24, and functionality provided in circuitry in close physical proximity to the read-out circuitry.

In one embodiment, a waveband layer, such as a filter mask 32, abuts, or is positioned in close proximity to, the pixels of the detector array 24, such that only photons of certain wavelengths, or within a certain waveband, are permitted to pass through to the pixels of the detector array 24 that are immediately downstream of the filter mask 32. As will be discussed in greater detail herein, the filter mask 32 may comprise any number of filter regions, with each filter region corresponding to a particular wavelength or waveband, and also corresponding to a particular subset of pixels on the detector array 24. One or more of the filter regions may be transparent, such that photons are not filtered, and such that the pixels immediately downstream of such transparent filter regions receive photons of incident radiation from the scene 26 of all wavelengths in such incident radiation. The filter mask 32 associates each of a plurality of different wavebands with a particular subset of pixels of the plurality of pixels that make up the detector array 24.

In another embodiment, rather than using the filter mask 32, the detector array 24 comprises particular subsets of pixels that are configured to detect photons in different wavebands based on a bias voltage applied to the particular subset of pixels. For example, a first subset of pixels detects a first waveband upon application of a positive bias voltage, and a second subset of pixels detects a second waveband upon application of a reverse bias voltage.

A communication interface 34 of the detector array 24 sends data, such as photon quantifiers, or images generated based on photon quantifiers, to a communication interface 36 of the device 12, and receives data from the device 12. In some embodiments, the detector array 24, filter mask 32, DAC 30, and communication interface 34 may be housed in a cooler, and thus, it may be desirable that the form factor of the detector array 24, filter mask 32, DAC 30, and communication interface 34 be as small as practicable.

The device 12 stores, in the memory 18, and/or in a storage 38, a waveband mapping 40 that comprises entries 42-1-42-N, which map various wavebands to corresponding filter regions on the filter mask 32 and subsets of pixels of the detector array 24. The waveband mapping 40 may be configured, or otherwise predetermined in the memory 18 and/or storage 38 based on the particular detector array 24 and filter mask 32 utilized for a particular application. In some embodiments, each entry 42 may be associated with a different infrared band such as a short-wave infrared (SWIR) band, a mid-wave infrared (MWIR) band, or a long-wave infrared (LWIR) band.

The device 12 includes one or more functional modules, such as an image processing module 43 that receives photon quantifiers, or images, from the detector array 24 and generates imagery, such as video imagery, for presentation on the display 22, or for use by other modules, such as a targeting module 44 and/or a missile detection module 46. The targeting module 44 may utilize such imagery to identify potential targets in the scene 26, for example. The missile detection module 46 may utilize such imagery to identify missile launches, for example.

In one embodiment, the device 12 receives a window selection signal that facilitates the determination of a read-out pixel window that comprises a subset of pixels of the detector array 24. The window selection signal may be generated in response to user input via the input interface 20, or may be generated automatically by the system 10 in response to some sensed condition.

The device 12, upon receipt of the window selection signal, accesses the waveband mapping 40, which may be maintained, for example, in the memory 18, and which maps various wavebands to corresponding subsets of pixels of the detector array 24, which in turn correspond to filter regions on the filter mask 32. For purposes of illustration, assume that the filter mask 32 comprises four filter regions, as will be discussed in greater detail below. Thus, in some embodiments, each read-out pixel window may be associated with a different infrared band.

Figure 2:
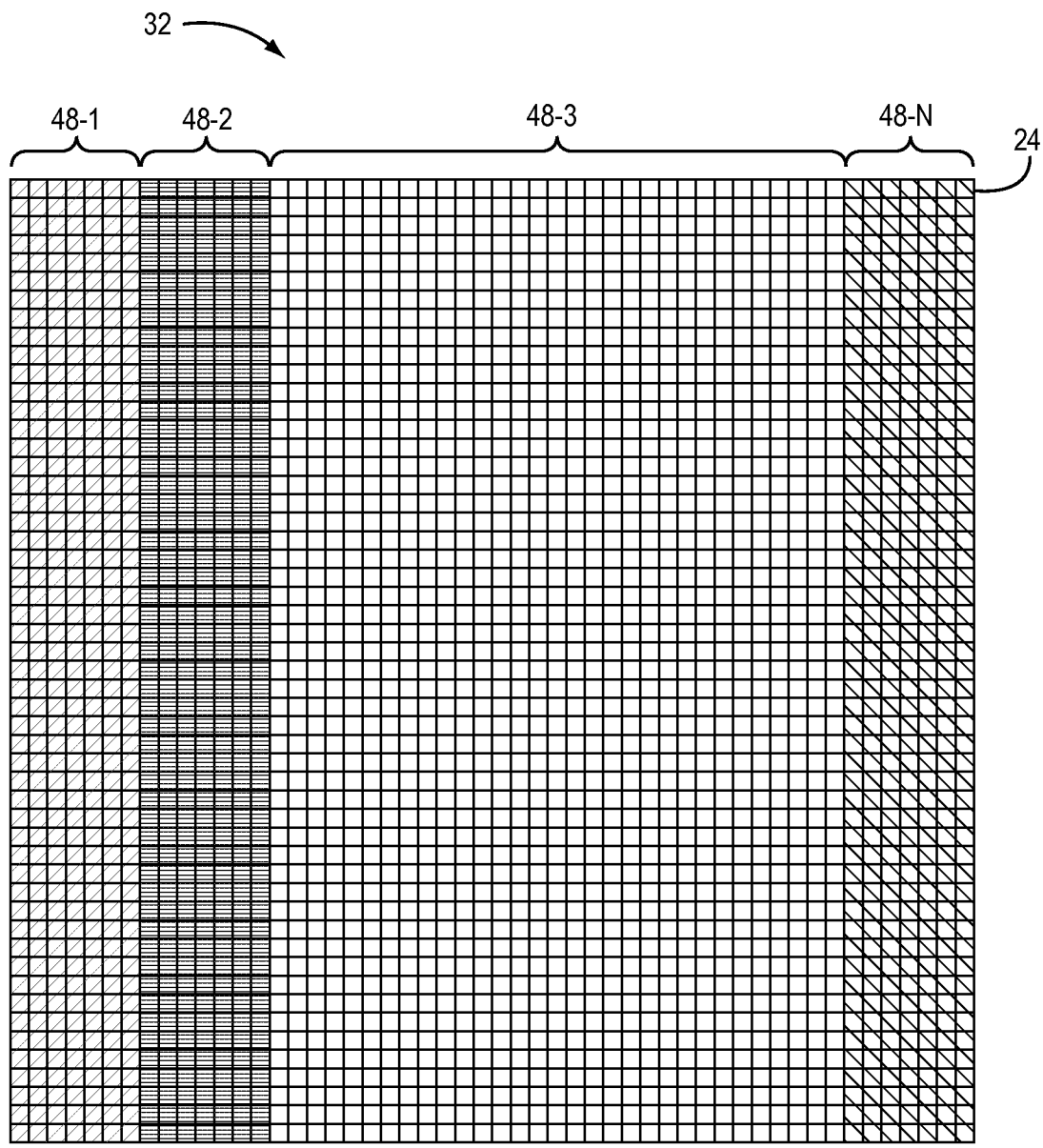
FIG. 2 is a block diagram of a plan view of a detector array and a filter mask according to one embodiment.

FIG. 2 is a block diagram of a plan view of the detector array 24 and filter mask 32 according to one embodiment. Due to limitations of drawings, the pixel resolution of the example detector arrays 24 illustrated herein is less than would likely be used in practice, which may comprise any desired resolution, such as, by way of non-limiting example, 256 columns by 256 rows, or 1024 columns by 1024 rows, or any other desired resolution. In this embodiment, the filter mask 32 comprises four filter regions 48-1-48-N. The filter region 48-1 corresponds to a first subset of pixels of the detector array 24, in particular a subset of pixels that comprises columns 1-7 of the detector array 24. The filter region 48-1 comprises a material that passes photons that have a wavelength within a first waveband to the first subset of pixels, and blocks photons having a wavelength outside of the first waveband, and thus prevents such photons from being received by the first subset of pixels.

The filter region 48-2 corresponds to a second subset of pixels of the detector array 24, in particular a subset of pixels that comprises columns 8-14 of the detector array 24. The filter region 48-2 comprises a material that passes photons that have a wavelength within a second waveband to the second subset of pixels, and blocks photons having a wavelength outside of the second waveband, and thus prevents such photons from being received by the second subset of pixels.

The filter region 48-3 corresponds to a third subset of pixels of the detector array 24, in particular a subset of pixels that comprises columns 15-45 of the detector array 24. The filter region 48-3 is transparent, and thus passes photons of all wavelengths to the third subset of pixels.

The filter region 48-N corresponds to a fourth subset of pixels of the detector array 24, in particular to a subset of pixels that comprises columns 46-52 of the detector array 24. The filter region 48-N comprises a material that passes photons that have a wavelength within a third waveband to the fourth subset of pixels, and blocks photons having a wavelength outside of the third waveband, and thus prevents such photons from being received by the fourth subset of pixels.

The first, second, and third wavebands may be any desired bands of wavelengths, such as SWIR, MWIR or LWIR, and may be selected based on a particular mission. For example, it may be known that anti-aircraft missiles emit photons of a particular wavelength or waveband during launch, and the first waveband may comprise that particular wavelength or waveband. The second and third wavebands may likewise comprise different wavebands of interest. In some embodiments, the wavebands may be configured to identify photons in wavelengths that facilitate identifying spectral signatures of one or more objects that may be present in the scene.

Figure 3:
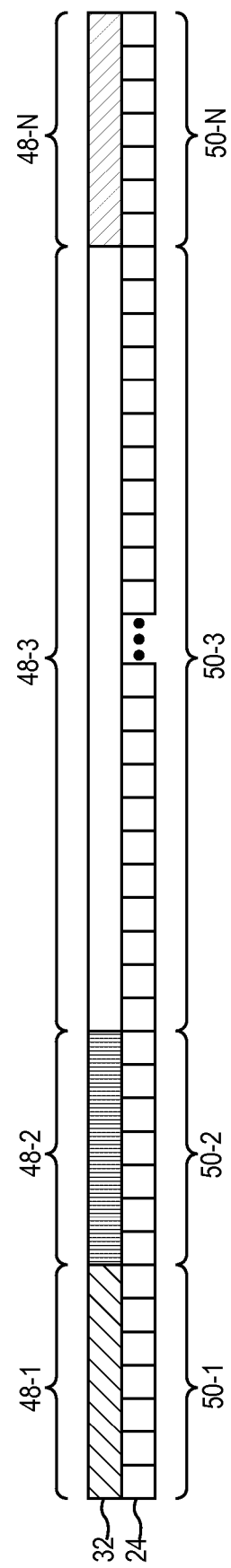
FIG. 3 is a block diagram of a side view of the detector array and the filter mask illustrated in FIG. 2.

FIG. 3 is a block diagram of a side view of the detector array 24 and filter mask 32 illustrated in FIG. 2. The filter mask 32 may, in one embodiment, be implemented as a coating that is applied directly to the detector array 24. The filter mask 32 may be maintained on a separate optical element that is placed in close proximity to, or which abuts, the detector array 24. Subsets 50-1-50-N of pixels (generally, subsets 50 of pixels) correspond to the filter regions 48-1-48-N. In particular, the subset 50-1 of pixels corresponds to the filter region 48-1; the subset 50-2 of pixels corresponds to the filter region 48-2; the subset 50-3 of pixels corresponds to the filter region 48-3; and the subset 50-N of pixels corresponds to the filter region 48-N. Because the photons pass through the respective filter regions 48 prior to receipt by the subsets 50 of pixels, the subsets 50 of pixels may be described herein as being downstream of the filter regions 48.

Figure 4:
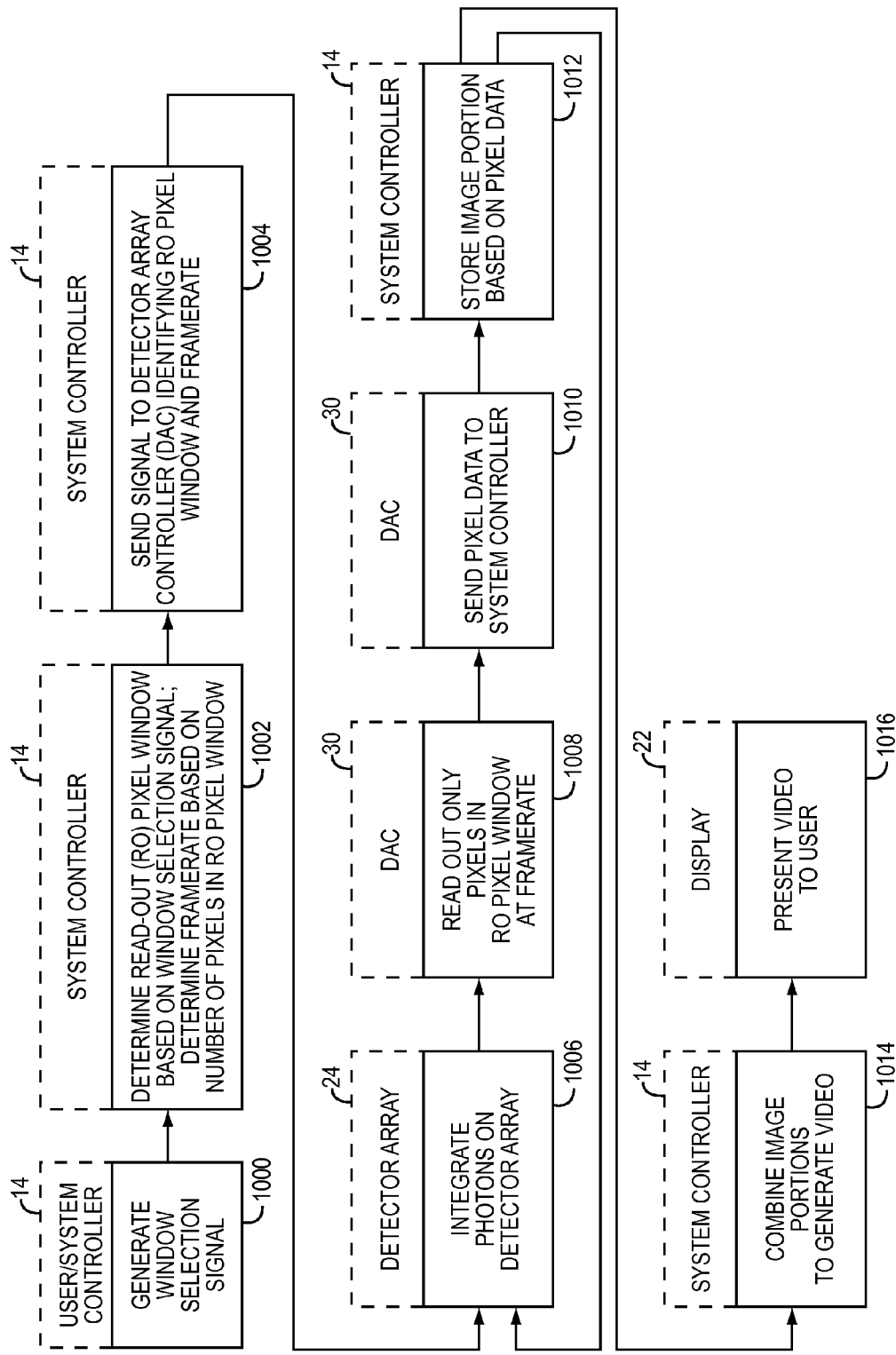
FIG. 4 is a block diagram illustrating a use of the system according to one embodiment.

FIG. 4 is a block diagram illustrating a use of the system 10 according to one embodiment. FIG. 4 will be discussed in conjunction with FIGS. 1 and 2. The embodiments facilitate a multiple mode, multiple waveband system, wherein the detector array 24 can be operated in multiple different operating modes, and can be directed to utilize any desired filter region 48. In one embodiment, the process may begin with the generation of a window selection signal (FIG. 4, block 1000). The window selection signal may be generated in response to user input, such as via a user who selects a desired waveband or wavebands via the input interface 20, or may be generated automatically, without user input, via the device 12 in response to an event, such as a timer, or in response to a detection of an event that has occurred in the scene 26.

The system controller 14 accesses the waveband mapping 40 and, based on the window selection signal, determines a read-out pixel window that comprises a subset of pixels of the detector array 24 (FIG. 4, block 1002). For example, the window selection signal may identify a particular waveband, such as the waveband illustrated as "WB1" in FIG. 1. The system controller 14 accesses the waveband mapping 40 and determines that the entry 42-1 in the waveband mapping 40 maps the waveband WB1 to columns 1-7 of the detector array 24. Thus, WB1 is the waveband associated with filter region 48-1. The system controller 14 may then determine that the read-out pixel window comprises columns 1-7 of the detector array 24.

The system controller 14, in one embodiment, may also determine a read-out framerate of the detector array 24 based on the number or pixels in the determined read-out pixel window (FIG. 4, block 1002). The read-out framerate defines the rate at which pixels are read out from the detector array 24, and at which images are generated. High read-out framerates have advantages and disadvantages. The higher the read-out framerate, the faster the sweep device 28 may scan the scene 26 with the detector array 24 while still avoiding blurring of the scene 26. The rate at which the sweep device 28 scans the scene 26 with the detector array 24 may be referred to herein as a sweep rate, and a sweep rate of 360 degrees per 1 or 2 seconds is desirable in certain applications, such as when in use in an aircraft, and when the potential for enemy attack is possible.

High read-out framerates, however, reduce the integration time of the detector array 24, so that sensitivity decreases. In one embodiment, the system 10 overcomes the problems associated with high read-out framerates by generating images at a relatively high read-out framerate, wherein each successive image includes an overlapping portion of the scene 26 captured in one or more previous images. The image processing module 43 combines the overlapping portions of the successive images to generate a relatively high sensitivity video image that may be presented to the user on the display 22, and/or utilized by other modules, such as the targeting module 44 or the missile detection module 46. According to one embodiment, the combined video image is an aggregate image that simulates a time delay integration scan of the scene 26. The combination of overlapping portions of successive images may also reduce or eliminate fixed pattern noise that may otherwise be present in the successive images.

In one embodiment, configuration data that identifies read-out attributes of the particular detector array 24 may be accessed and utilized to determine a maximum read-out framerate based on a number of pixels in the determined read-out pixel window. For example only, if the determined read-out pixel window comprises 7168 pixels (i.e., 7×1024 pixels), the detector array 24 may be capable of reading out 7168 pixels at a read-out framerate of 2 kHz. If the determined read-out pixel window comprises 14336 pixels (i.e., 14×1024 pixels), the detector array 24 may be capable of reading out 14336 pixels at a read-out framerate of 1 kHz. The read-out framerate may also be utilized by the sweep device 28 to determine the appropriate sweep rate. A longer read-out framerate may result in a lower sweep rate than a shorter read-out framerate.

The system controller 14 sends a signal to the DAC 30 identifying the read-out pixel window and, if determined, the read-out framerate (FIG. 4, block 1004). The detector array 24 integrates photons via the subset 50 of pixels that make up the read-out pixel window, in this example, the subset 50-1 of pixels (FIG. 4, block 1006). The detector array 24 may also integrate photons on other pixels in the detector array 24, or may not, depending on the ability of the detector array 24 to selectively integrate photons. In accordance with a duration of time consistent with the read-out framerate, the DAC 30 reads out only those pixels in the read-out pixel window, in this example, the subset 50-1 of pixels (FIG. 4, block 1008). Because only the subset 50-1 of pixels are being read out, the read-out period may be relatively short, and the next frame may begin immediately after the subset 50-1 of pixels are read out, facilitating relatively high read-out framerates. The DAC 30 sends the pixel data read out from the subset 50-1 of pixels to the system controller 14 (FIG. 4, block 1010). The system controller 14 may generate an image portion based on the pixel data, and store the image portion. By image portion, it is meant that the image portion depicts only a portion of the scene 26 and, in particular, that portion that was incident on the subset 50-1 of pixels during that particular frame.

The process described with respect to blocks 1006-1012 may repeat for a predetermined period of time, or until interrupted by a user, or in response to some detected event. The process described with respect to blocks 1006-1012 is substantially similar whether the detector array 24 is operating in scan mode or in stare mode. In parallel with the iterative processing of blocks 1006-1012, the system controller 14 may in real-time combine the image portions that are generated from the pixel data received from the DAC 30 to generate video, and continually present the video on the display 22, and/or provide the video to the targeting module 44 and/or the missile detection module 46 (FIG. 4, blocks 1014-1016).

Figure 5B:
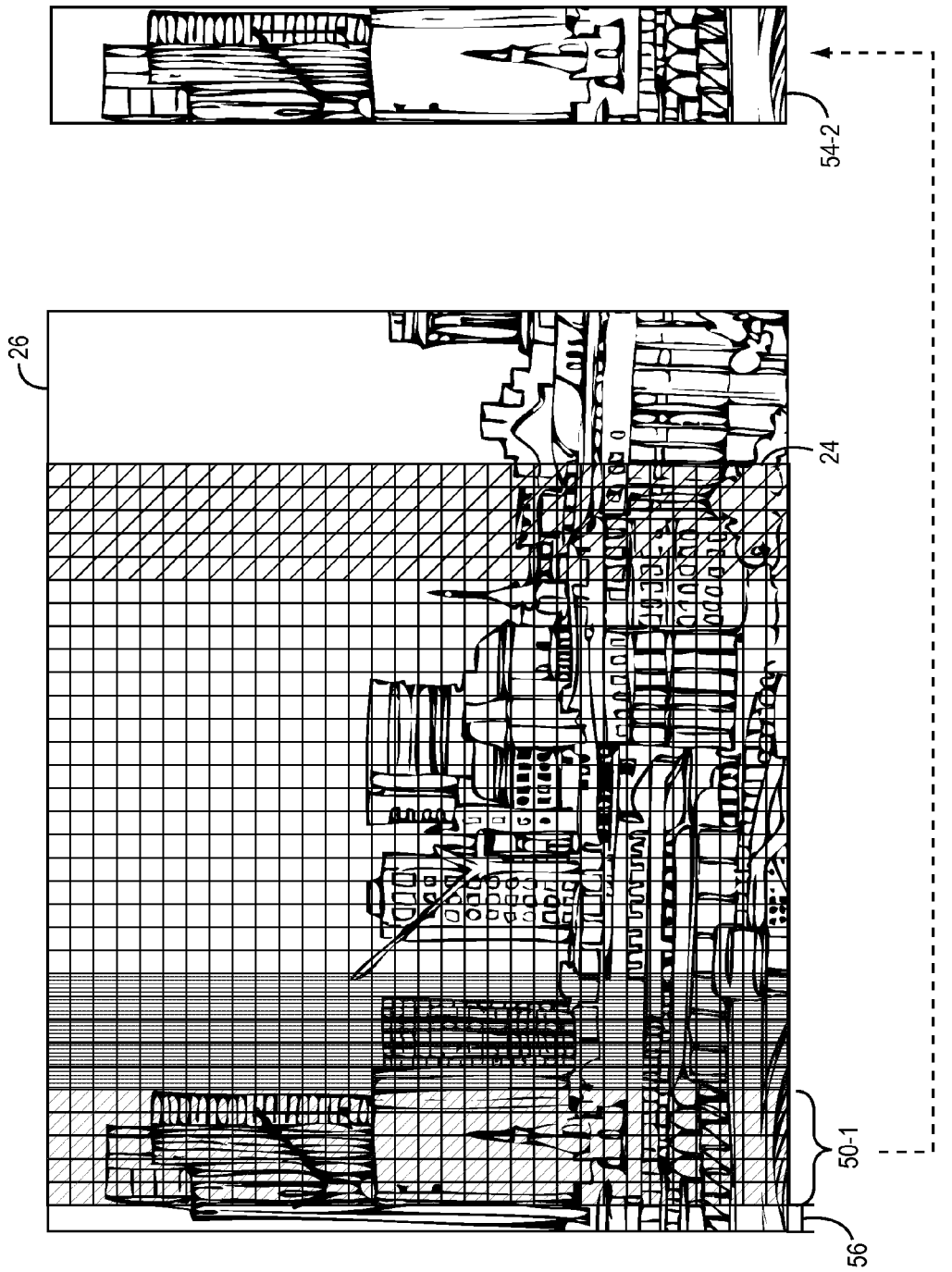

FIGS. 5A-5D illustrate the detector array 24 being operated in the continuous scan mode over a period of time according to one embodiment. Referring first to FIG. 5A, assume that the system controller 14 has received a window selection signal that indicates a desire to receive imagery in a waveband that corresponds to the filter region 48-1. As discussed above, the system controller 14 accesses the waveband mapping 40, identifies the subset 50-1 of pixels of the detector array 24 as corresponding to the requested waveband, and identifies the read-out pixel window as comprising the subset 50-1 of pixels. The system controller 14 may also determine the read-out framerate of the detector array 24 based on the read-out pixel window. The system controller 14 sends a signal to the DAC 30 identifying the read-out pixel window and the read-out framerate. In some embodiments, the signal may also include a mode indicator, indicating that the detector array 24 is to be operated in the continuous scan mode.

The sweep device 28 scans the scene 26 with the detector array 24 in a continuous movement. After a predetermined integration time, based on the read-out framerate, the DAC 30 reads out the subset 50-1 of pixels, and sends the resulting pixel data to the system controller 14. Based on the pixel data, the system controller 14 stores an image portion 54-1 of the scene 26. Note that the image portion 54-1 depicts a portion, sometimes referred to as a slice, of the scene 26 that is based on the photons integrated on the subset 50-1 of pixels during the respective frame.

FIG. 5B illustrates the detector array 24 at a successive point in time to that illustrated in FIG. 5A. The detector array 24 has moved a distance 56 with respect to the scene 26 from the point in time illustrated in FIG. 5A, which may comprise, in one embodiment, a distance that corresponds to the width of a column of pixels of the detector array 24. After a predetermined integration time, based on the read-out framerate, the DAC 30 reads out the subset 50-1 of pixels, and sends the resulting pixel data to the system controller 14. Based on the pixel data, the system controller 14 stores an image portion 54-2 of the scene 26. Note that the image portion 54-2 depicts a portion of the scene 26 that overlaps with a portion of the scene 26 depicted in the image portion 54-1.

Figure 5C:
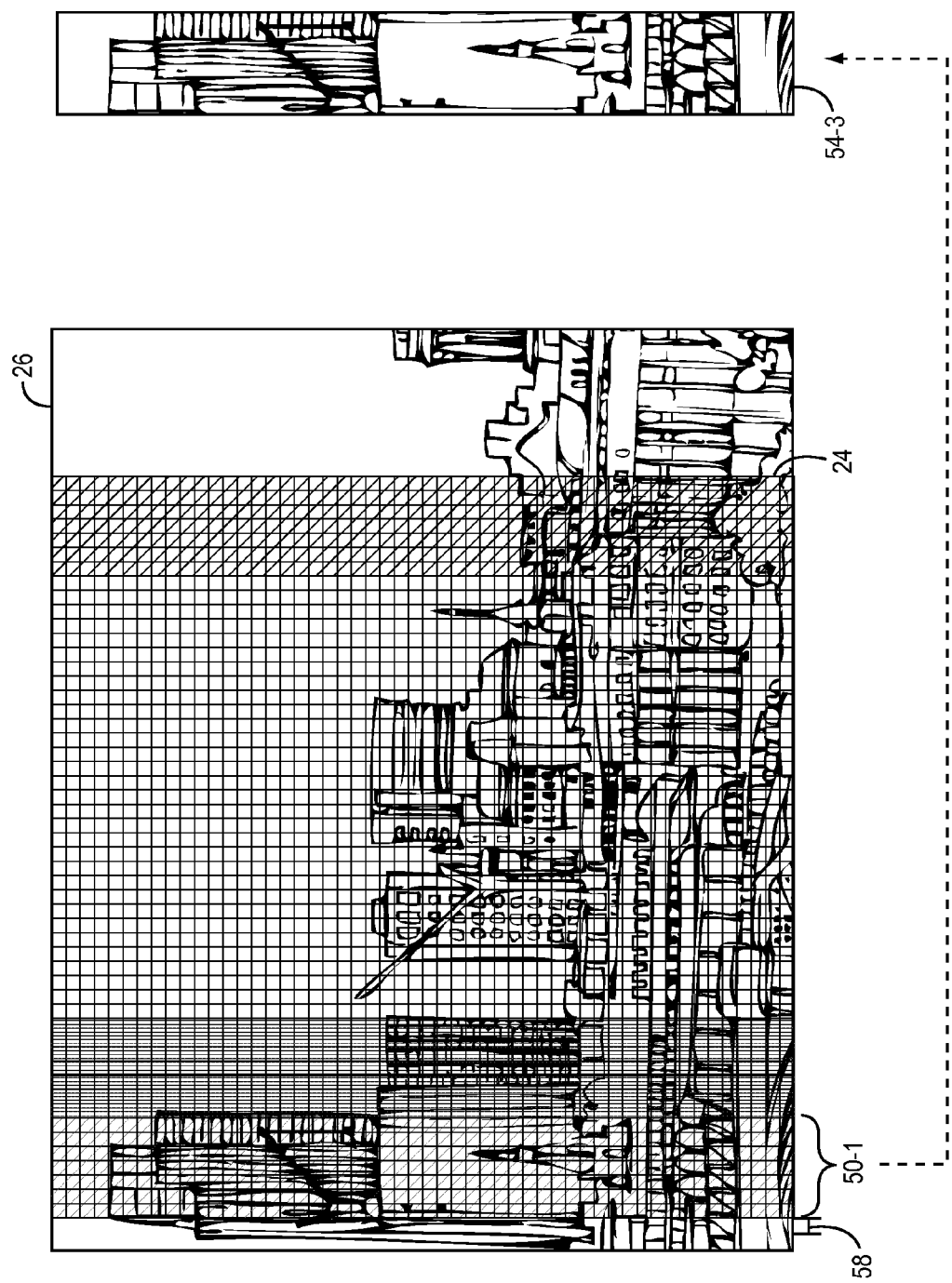

FIG. 5C illustrates the detector array 24 at a successive point in time to that illustrated in FIG. 5B. The detector array 24 has moved a distance 58 with respect to the scene 26 from the point in time illustrated in FIG. 5B. After a predetermined integration time, based on the read-out framerate, the DAC 30 reads out the subset 50-1 of pixels, and sends the resulting pixel data to the system controller 14. Based on the pixel data, the system controller 14 stores an image portion 54-3 of the scene 26. Note that the image portion 54-3 depicts portions of the scene 26 that overlap with the portion of the scene 26 depicted in the image portion 54-1, as well as the portion of the scene 26 depicted in the image portion 54-2.

Figure 5D:
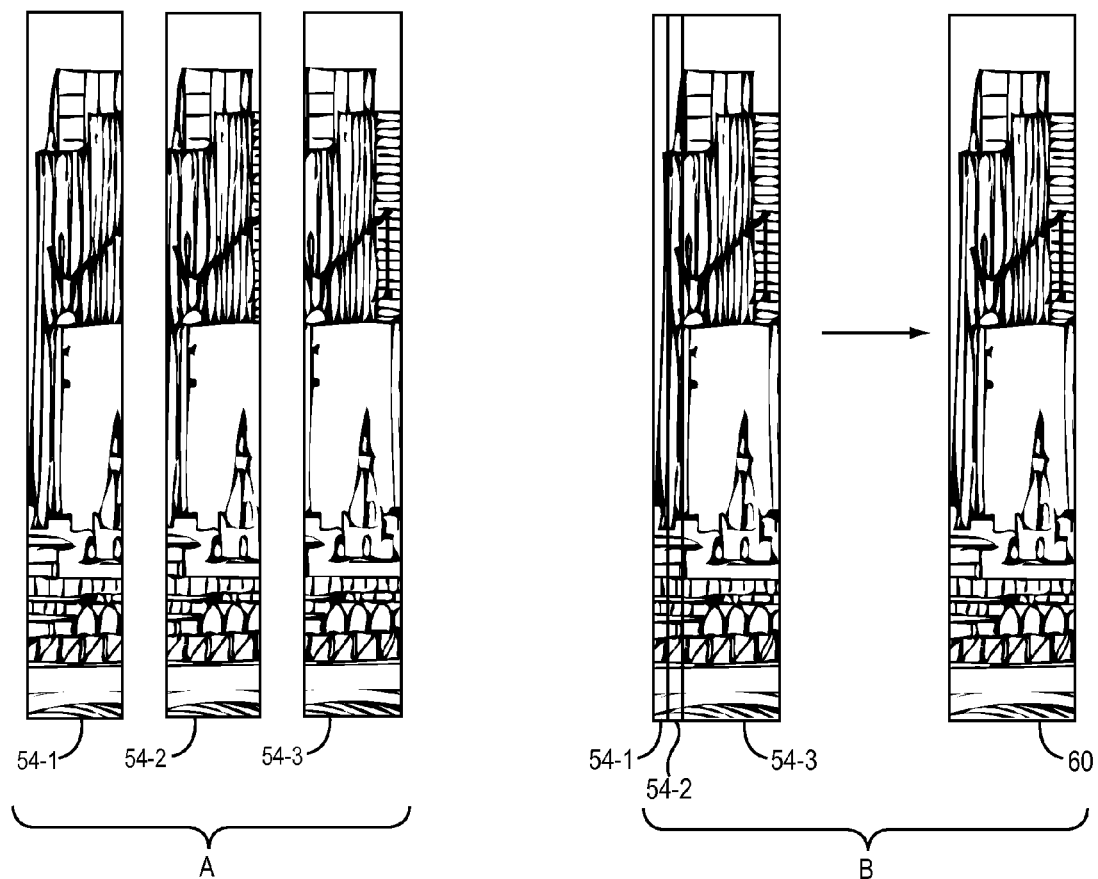

FIG. 5D illustrates image processing that may be performed by the image processing module 43 of the device 12, substantially in parallel with the operation of the detector array 24 in the continuous scan mode. At step A, the image processing module 43 accesses the image portions 54-1-54-3. At step B, the image processing module 43 combines those portions of the image portions 54-1-54-3 that depict the same portions of the scene 26 to generate video 60. This process in essence integrates the pixel data captured in each image portion 54-1-54-3, resulting in an increase in sensitivity in the video 60 and a decrease or elimination of fixed pattern noise.

Because the detector array 24 was operated at a sufficiently high read-out framerate, facilitated by reading out only the subset 50-1 of pixels for each frame, the scene 26 remains unblurred. Moreover, the high read-out framerate facilitates a relatively high sweep rate of the sweep device 28. The video 60 may be presented continuously on the display 22, and/or provided continuously to a processing module for additional processing, such as the targeting module 44, which may analyze the video 60 for potential targets of interest, and the missile detection module 46, which may analyze the video 60 for missile launches.

Figure 6:
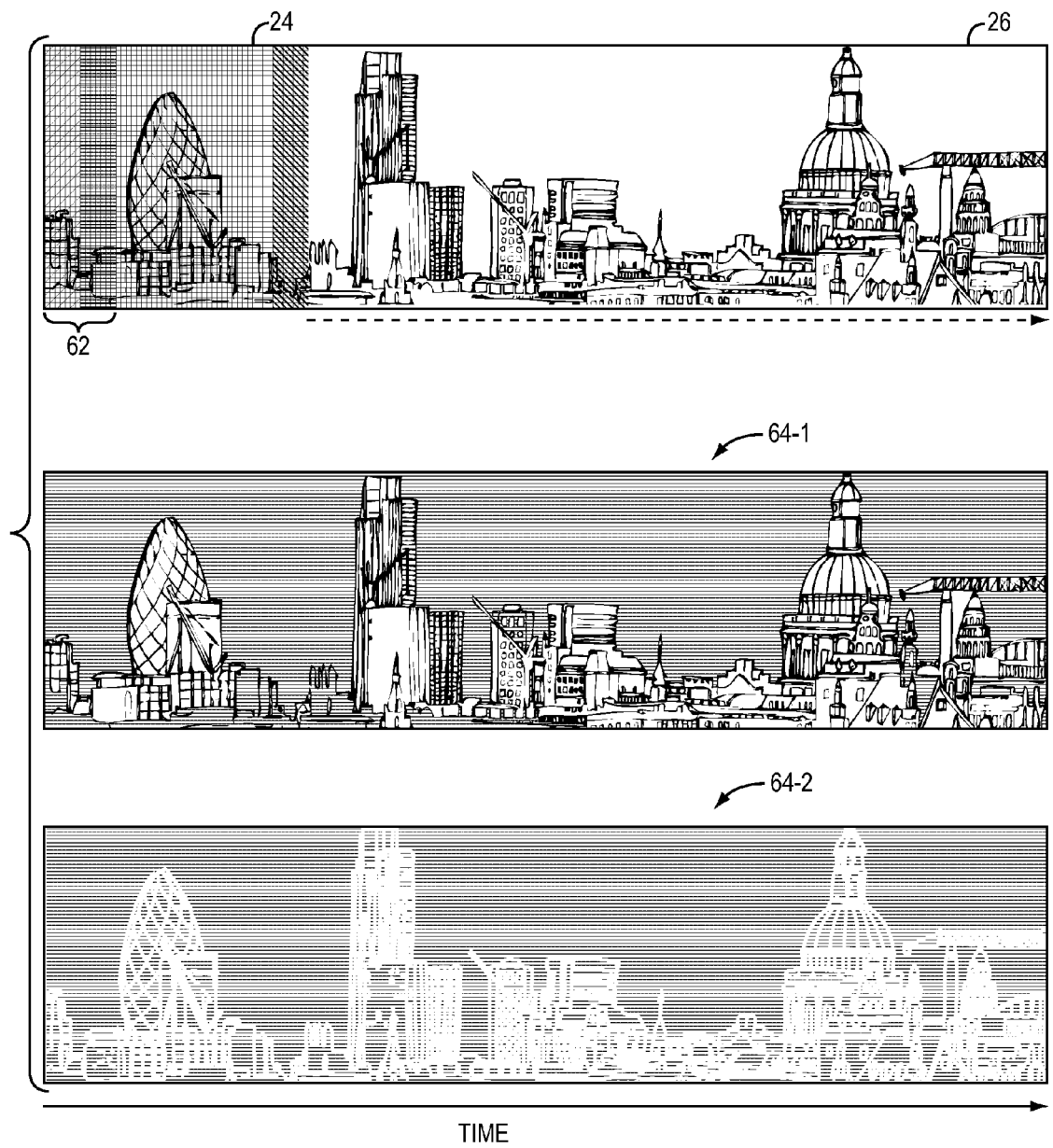
FIG. 6 is a block diagram illustrating a read-out pixel window that encompasses multiple filter regions of the filter mask according to one embodiment.

FIG. 6 is a block diagram illustrating a read-out pixel window that encompasses multiple filter regions of the filter mask 32 according to one embodiment. In this embodiment, the system controller 14 receives a window selection signal that identifies two wavebands: WB1 and WB2, as illustrated in FIG. 1. The system controller 14 accesses the waveband mapping 40 and determines, based on the entries 42-1, 42-2, a read-out pixel window 62 that encompasses the subsets 50-1, 50-2 of pixels that correspond to the filter regions 48-1, 48-2. The system controller 14 may also determine a read-out framerate for the detector array 24 based on the read-out pixel window. The system controller 14 sends a signal to the DAC 30 identifying the read-out pixel window and the read-out framerate.

Assume for purposes of illustration that the detector array 24 is operating in continuous scan mode. The sweep device 28 scans the scene 26 with the detector array 24 in a continuous movement at a sweep rate based on the read-out framerate. After a predetermined integration time, based on the read-out framerate, the DAC 30 reads out the subsets 50-1, 50-2 of pixels, and sends the resulting pixel data to the system controller 14.

Based on the pixel data corresponding to the subset 50-1 of pixels, the system controller 14 stores a first image portion, and based on the pixel data corresponding to the subset 50-2 of pixels, the system controller 14 stores a second image portion. As described above with regard to FIGS. 5A-5D, this process occurs iteratively, over a period of time, resulting in the generation of a plurality of first image portions that are associated with the subset 50-1 of pixels, and thus that are based on photons from the scene 26 that are in the waveband WB1, as well as resulting in the generation of a plurality of second image portions that are associated with the subset 50-2 of pixels, and thus that are based on photons from the scene 26 that are in the waveband WB2. The system controller 14, as discussed above with regard to FIG. 5D, continually processes the plurality of first image portions to generate a video 64-1 that depicts the scene 26 based on photons having wavelengths within the waveband WB1, and concurrently processes the plurality of second image portions to generate a video 64-2 that depicts the scene 26 based on photons having wavelengths within the waveband WB2. The videos 64-1, 64-2 may, for example, be presented on the display 22. The videos 64-1, 64-2 may also be sent to desired processing modules. For example, the waveband WB1 may be a waveband of energy that is particularly suitable for identifying potential targets, and thus, the video 64-1 may be provided to the targeting module 44. The waveband WB2 may be a waveband of energy that is particularly suitable for identifying missile launches, and thus, the video 64-2 may be provided to the missile detection module 46.

Figure 7:
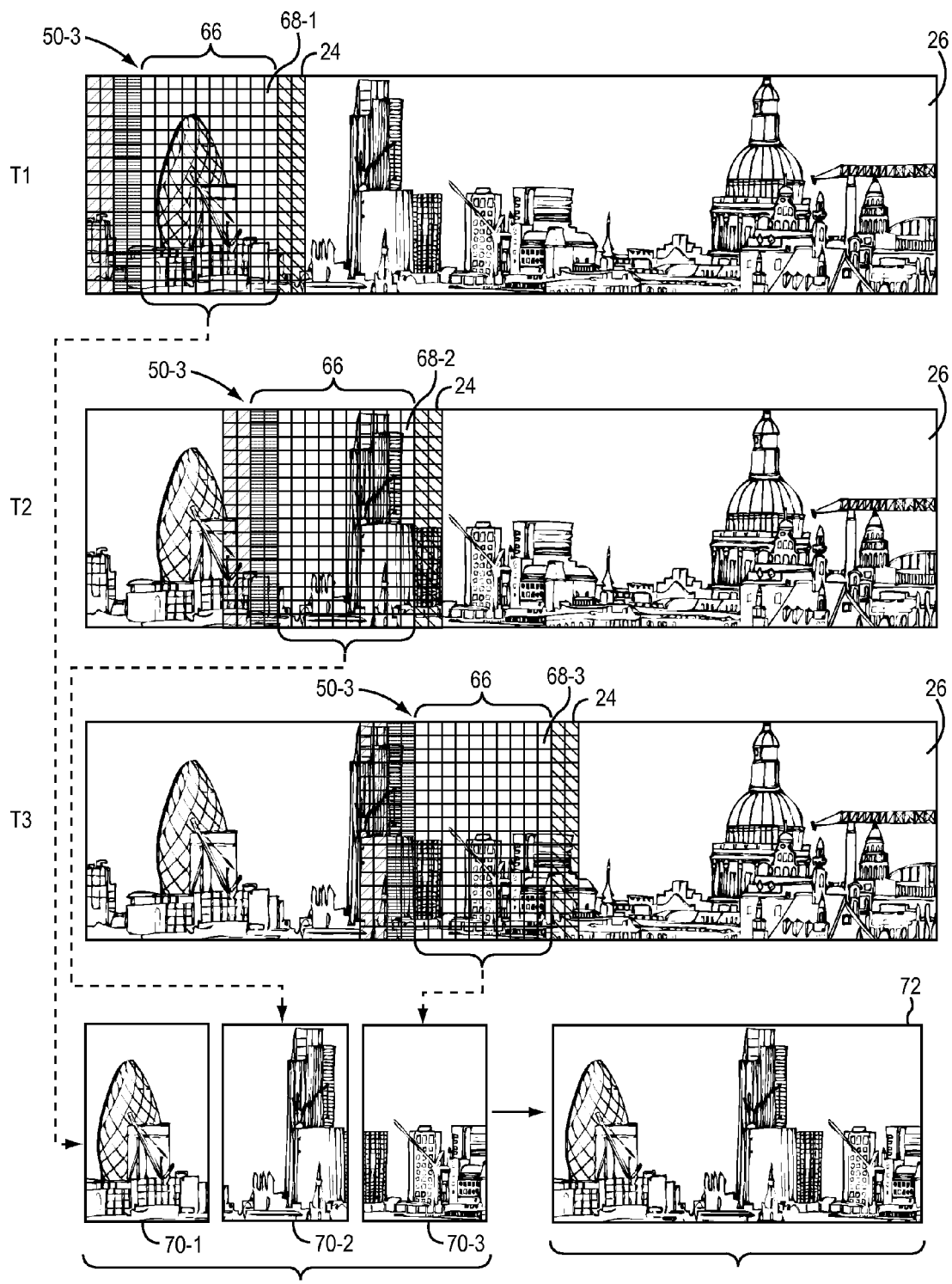
FIG. 7 is a block diagram illustrating the detector array operating in a stare mode according to one embodiment.

FIG. 7 is a block diagram illustrating the detector array 24 operating in the stare mode according to one embodiment. In this embodiment, assume that the system controller 14 receives a window selection signal that identifies a broadband, or unfiltered, waveband WB3. The system controller 14 accesses the waveband mapping 40, and based on the entry 42-3, determines that the WB3 is associated with the filter region 48-3, and corresponds to the subset 50-3 of pixels. The system controller 14 determines a read-out pixel window 66 that comprises the subset 50-3 of pixels. The system controller 14 may also receive information that indicates a desire to operate in the stare mode. In some embodiments, selection of a particular waveband may automatically change the mode to either the continuous scan mode or the stare mode. For example, selection of the waveband WB3 may result in the system controller 14 automatically directing the detector array 24 to operate in the stare mode. The system controller 14 sends a signal to the DAC 30 identifying the read-out pixel window.

In the stare mode, the sweep device 28 operates to iteratively cause the scene 26 to be moved with respect to the detector array 24 in increments such that successive portions of the scene 26 are incident on the detector array 24 during successive frames. While a portion of the scene 26 is incident on the detector array 24, the sweep device 28, in contrast to the continuous scan mode, halts the detector array 24 to allow the detector array 24 to integrate photons during an integration period of the frame. After the integration period, the sweep device 28 causes the scene 26 to be moved with respect to the detector array 24 in another increment such that an immediately adjacent portion of the scene 26 is incident on the detector array 24. In the stare mode, image portions that are generated based on the pixel data may not overlap one another.

At a time T1, the sweep device 28 moves the scene 26 with respect to the detector array 24 such that a scene portion 68-1 is incident on the subset 50-3 of pixels defined by the read-out pixel window 66. The detector array 24 is halted for a short duration based on the read-out framerate, and photons are integrated by the subset 50-3 of pixels. After an integration period, the subset 50-3 of pixels is read out, and the corresponding pixel data is provided to the system controller 14. The system controller 14 generates an image portion 70-1 of the scene portion 68-1 based on the pixel data.

At a time T2, the sweep device 28 moves the scene 26 with respect to the detector array 24 such that a scene portion 68-2 is incident on the subset 50-3 of pixels defined by the read-out pixel window 66. Note that the scene portion 68-2 is immediately adjacent to the scene portion 68-1. The detector array 24 is halted for a short duration, based on the read-out framerate, and photons are integrated by the subset 50-3 of pixels. After an integration period, the subset 50-3 of pixels are read out, and the corresponding pixel data is provided to the system controller 14. The system controller 14 generates an image portion 70-2 of the scene portion 68-2 based on the pixel data.

At a time T3, the sweep device 28 moves the scene 26 with respect to the detector array 24 such that a scene portion 68-3 is incident on the subset 50-3 of pixels defined by the read-out pixel window 66. Note that the scene portion 68-3 is immediately adjacent to the scene portion 68-2. The detector array 24 is halted for a short duration, based on the read-out framerate, and photons are integrated by the subset 50-3 of pixels. After an integration period, the subset 50-3 of pixels are read out, and the corresponding pixel data is provided to the system controller 14. The system controller 14 generates an image portion 70-3 of the scene portion 68-3 based on the pixel data.

The image processing module 43 combines the image portions 70-1-70-3, by appending the image portions 70-1-70-3 to one another, to generate video 72. The video 72 may be presented continuously on the display 22, and/or provided continuously to a processing module for additional processing, such as the targeting module 44, which may analyze the video 60 for potential targets of interest, and such as the missile detection module 46, which may analyze the video 60 for missile launches.

Figure 8:
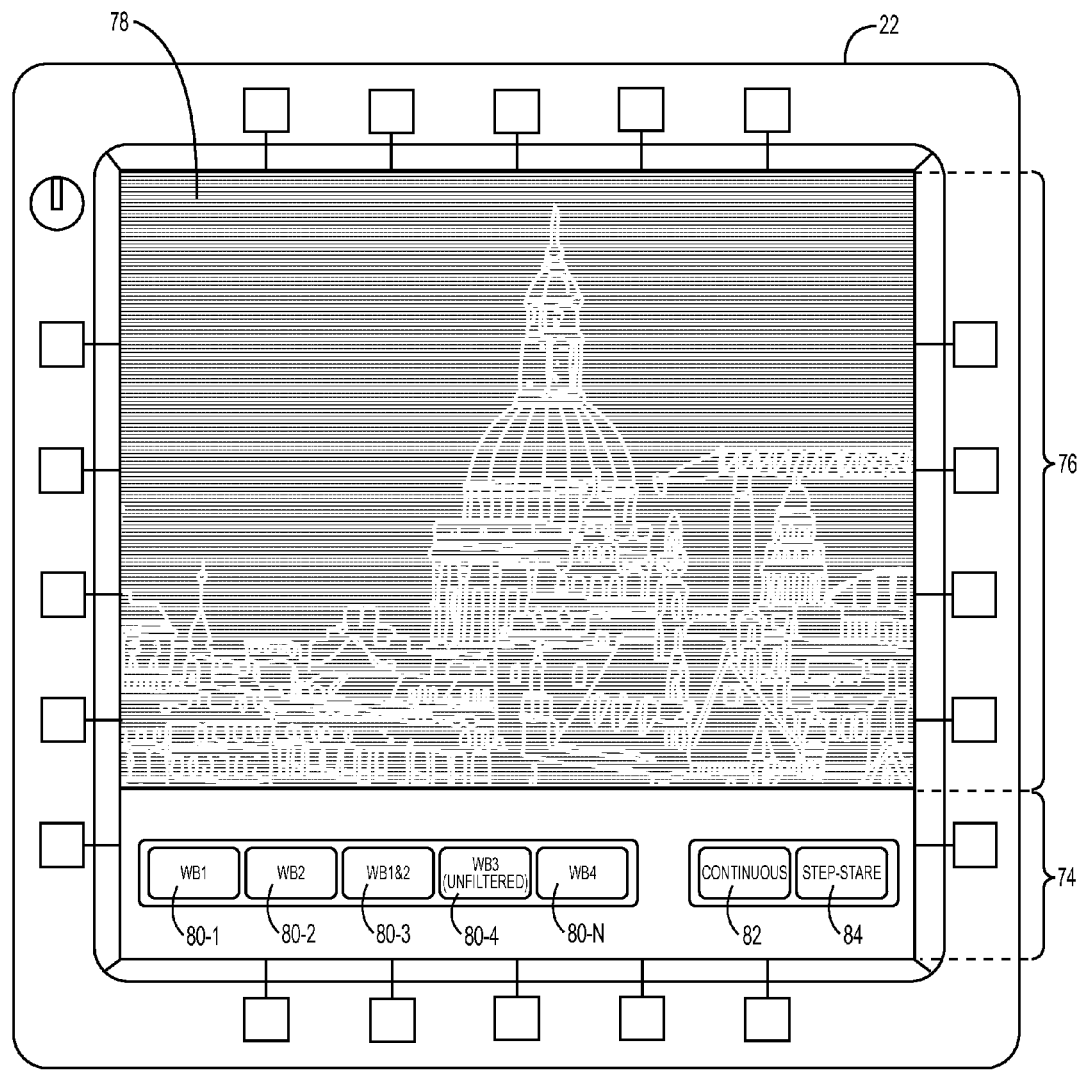
FIG. 8 is a diagram of an input interface that allows the user to select a desired waveband and a desired operating mode according to one embodiment.

FIG. 8 is a diagram of an input interface that allows the user to select a desired waveband and a desired operating mode according to one embodiment. In this embodiment, the display 22 comprises a touch-sensitive surface area 74, and a video presentation area 76 wherein a video 78 generated from pixel data read out from the detector array 24 in accordance with the embodiments may be presented. In this embodiment, a plurality of input controls 80-1-80-N (generally, input controls 80) may be presented to the user, each input control 80 being associated with one or more wavebands. User selection, such as by touching one of the input controls 80, is interpreted by the system controller 14 as a window selection signal. The system controller 14 then processes the window selection signal to identify a read-out pixel window, as discussed above. The resulting video 78 generated may be presented in the video presentation area 76, and/or provided to one or more processing modules for analysis, as discussed above.

A continuous scan mode input control 82 and a stare mode input control 84 may also be presented in the touch-sensitive surface area 74 to the user. User selection of the continuous scan mode input control 82 causes the system controller 14 to communicate with the DAC 30 to cause the detector array 24 to be operated in continuous scan mode. User selection of the stare mode input control 84 causes the system controller 14 to communicate with the DAC 30 to cause the detector array 24 to be operated in the stare mode.

The various controls allow user selection of both wavebands and modes. For example, the system controller 14 may receive at a first time a first window selection signal that identifies the waveband WB1. The system controller 14 determines a first read-out pixel window comprising the subset 50-1 of pixels. Iteratively, over a first period of time, the detector array 24 integrates photons on the detector array 24, reads out only the subset 50-1 of pixels, and the system controller 14 generates first image portions based on the pixel data. A first video stream may be generated based on the first image portions.

After the first period of time, the user may select a different waveband, such as waveband WB2. The system controller 14 determines a second read-out pixel window comprising the subset 50-2 of pixels. Iteratively, over a second period of time, the detector array 24 integrates photons on the detector array 24, reads out only the subset 50-2 of pixels, and the system controller 14 generates second image portions based on the pixel data. A second video stream may be generated based on the second image portions.

Figure 9:
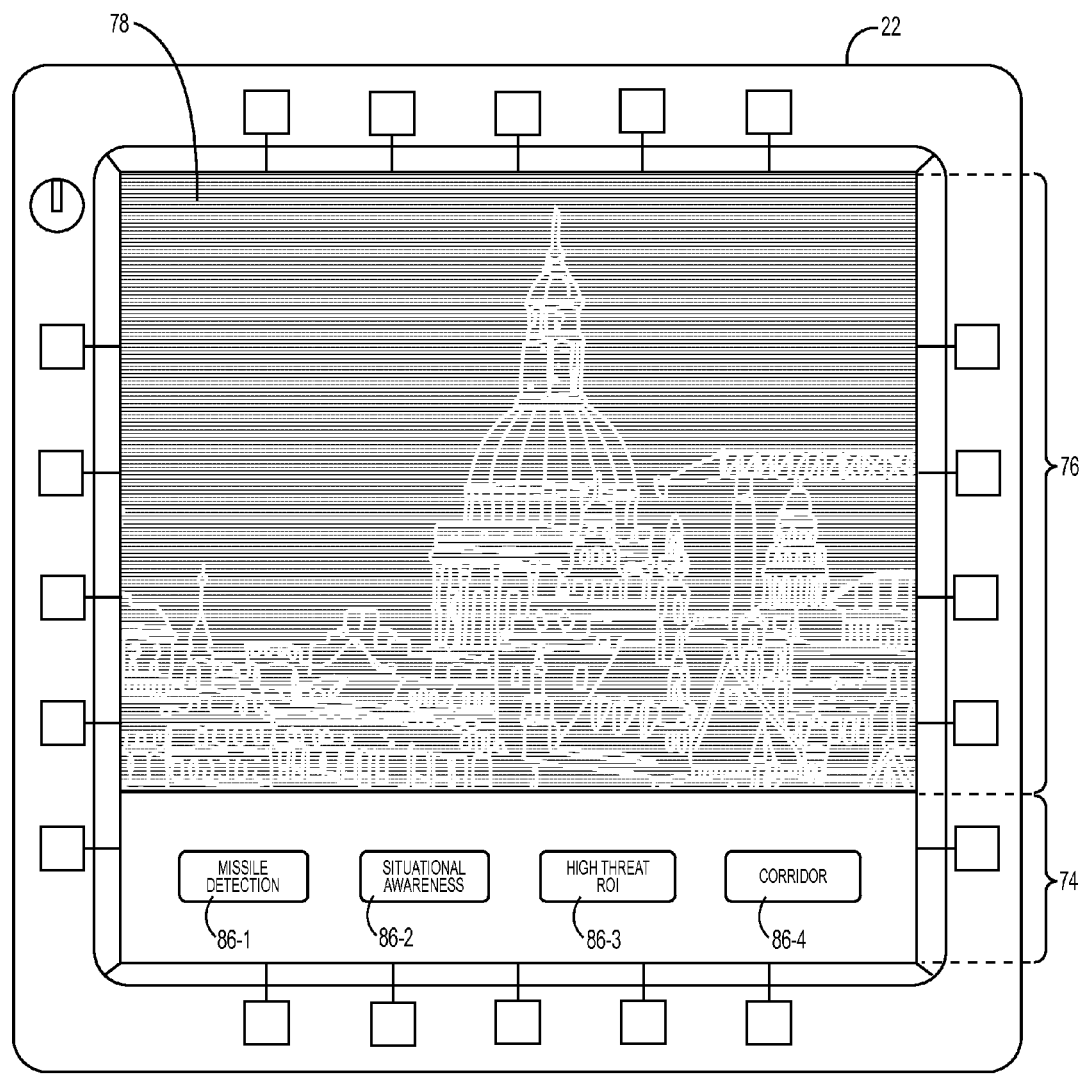
FIG. 9 is a diagram of an input interface according to another embodiment.

FIG. 9 is a diagram of an input interface according to another embodiment. In this embodiment, a plurality of input controls 86-1-86-4 (generally, input controls 86) contain goal-focused labels, such as "Missile Detection", "Situational Awareness," "High Threat ROI", and "Corridor." Each input control 86 is associated with a particular window selection signal that identifies a waveband, and/or a mode, suitable for accomplishing a desired goal. In some embodiments, the selection of an input control 86 may initiate a sequence of a plurality of different modes, and/or different wavebands. For example, the selection of the input control 86-2 may initiate a sequence of modes and window selection signals that includes a scanning mode in a first waveband for a first period of time, a staring mode with a second waveband for a second period of time, and a scanning mode utilizing multiple wavebands for a third period of time. This sequence may repeat until another operator input is received.

While for purposes of illustration the system 10 has been described in terms of implementing both multiple modes and multiple wavebands, in some embodiments, the system 10 may implement a single mode and multiple wavebands.

Those skilled in the art will recognize improvements and modifications to the preferred embodiments of the disclosure. All such improvements and modifications are considered within the scope of the concepts disclosed herein and the claims that follow.

What is claimed is:
1. A system comprising:
a detector array comprising a plurality of pixels;
a sweep device configured to move the detector array with respect to a scene;
a system controller coupled to the detector array and the sweep device and configured to:
present, on a display, a first set of mode selection input controls and a second set of waveband input controls, the first set of mode selection input controls comprising a first mode selection input control associated with a scan mode and a second mode selection input control associated with a stare mode, and the second set of waveband input controls comprising a plurality of waveband input controls, each waveband input control associated with a corresponding waveband of a plurality of different wavebands;
determine an operating mode that comprises one of the scan mode and the stare mode based on a receipt of a user selection of either the first mode selection input control or the second mode selection input control;
determine a first read-out pixel window comprising a first subset of pixels of the plurality of pixels of the detector array based on a receipt of a user selection of one of the plurality of waveband input controls, by:
accessing a waveband mapping that maps each waveband of the plurality of different wavebands to a corresponding subset of pixels; and
determining, based on the waveband mapping and the waveband that corresponds to the one of the plurality of waveband input controls, the first read-out pixel window;
in the stare mode, generate, via the first read-out pixel window, a plurality of images of the scene at a first read-out framerate in the waveband that corresponds to the one of the plurality of waveband input controls; and
in the scan mode:
continuously move the detector array with respect to the scene; and
read out the first read-out pixel window at a second read-out framerate that is a higher read-out framerate than the first read-out framerate to generate a plurality of images in the waveband that corresponds to the one of the plurality of waveband input controls.

2. The system of claim 1, further comprising a plurality of read-out pixel windows, each read-out pixel window associated with a different subset of pixels of the plurality of pixels.

3. The system of claim 2 wherein each read-out pixel window is associated with a different infrared band of a plurality of infrared bands.

4. The system of claim 3, wherein the different infrared band is selected from a short-wave infrared band, a mid-wave infrared band, and a long-wave infrared band.

5. The system of claim 1, further comprising a second read-out pixel window, the second read-out pixel window being associated with a second subset of pixels of the plurality of pixels that is different from the first subset of pixels, and wherein, in the scan mode, the system controller is configured to simultaneously read out the first read-out pixel window and the second read-out pixel window.

6. The system of claim 5, wherein the first read-out pixel window is associated with a first infrared band and the second read-out pixel window is associated with a second infrared band.

7. The system of claim 5, wherein the system controller is configured to simultaneously read out the first read-out pixel window and the second read-out pixel window at a third read-out framerate that is higher than the first read-out framerate and lower than the second read-out framerate.

8. The system of claim 1, wherein the system controller is configured to move the detector array with respect to the scene at a sweep rate that is based on a number of pixels in the first read-out pixel window.

9. The system of claim 1, wherein the system controller is configured to move the detector array with respect to the scene at a sweep rate that is based on the first read-out pixel window.

10. The system of claim 1, wherein in the scan mode, the system controller is further configured to generate a plurality of overlapping images of the scene from the first subset of pixels at the second read-out framerate, and to post process the plurality of images to form an aggregate image that simulates a time delay integration scan of the scene.

11. The system of claim 1, wherein the one of the plurality of waveband input controls is associated with a first waveband and a second waveband, and wherein the first subset of pixels in the first read-out pixel window comprises a first plurality of pixels associated with the first waveband and a second plurality of pixels associated with the second waveband, and wherein a plurality of first image portions are based on the first plurality of pixels, and wherein in the scan mode the system controller is configured to:
generate the plurality of first image portions of the scene and a plurality of second image portions of the scene over a period of time by, for each frame of a plurality of frames, at the second read-out framerate:
integrate photons on the detector array;
read out pixel data from only the first subset of pixels in the first read-out pixel window;
store a first image portion of the scene of the plurality of first image portions of the scene based on pixel data read from the first plurality of pixels; and
store a second image portion of the scene of the plurality of second image portions of the scene based on pixel data read from the second plurality of pixels.

12. A method for generating imagery of a scene comprising:
presenting, on a display, a first set of mode selection input controls and a second set of waveband input controls, the first set of mode selection input controls comprising a first mode selection input control associated with a scan mode and a second mode selection input control associated with a stare mode, and the second set of waveband input controls comprising a plurality of waveband input controls, each waveband input control associated with a corresponding waveband of a plurality of different wavebands;
determining an operating mode that comprises one of the scan mode and the stare mode based on a receipt of a user selection of either the first mode selection input control or the second mode selection input control;
determining a first read-out pixel window of a detector array, the first read-out pixel window comprising a first subset of pixels of a plurality of pixels of the detector array based on a receipt of a user selection of one of the plurality of waveband input controls, by:
accessing a waveband mapping that maps each waveband of the plurality of different wavebands to a corresponding subset of pixels; and
determining, based on the waveband mapping and the waveband that corresponds to the one of the plurality of waveband input controls, the first read-out pixel window;
in the stare operating mode:
moving the scene to a first location with respect to the detector array;
halting the scene with respect to the detector array;
reading out first data from each pixel in the first read-out pixel window at a first read-out framerate; and
generating first imagery in the waveband that corresponds to the one of the plurality of waveband input controls based on the first data; and
causing presentation of the first imagery on a display; and
in the scan operating mode:
continuously moving the detector array with respect to the scene;
reading out only second data from each pixel in the first read-out pixel window at a second read-out framerate that is a higher read-out framerate than the first read-out framerate;
generating second imagery in the waveband that corresponds to the one of the plurality of waveband input controls based on the second data; and
causing presentation of the second imagery on the display.

13. The method of claim 12, wherein the first read-out pixel window is configured to detect photons in a first infrared band, and further comprising:
determining a second read-out pixel window comprising a second subset of pixels of the plurality of pixels, the second read-out pixel window configured to detect photons in a second infrared band that is different from the first infrared band;
continuously moving the detector array with respect to the scene; and
reading out the second read-out pixel window.

14. The method of claim 12, wherein the first subset of pixels is configured to detect photons in a first infrared band, and wherein continuously moving the detector array with respect to the scene further comprises continuously moving the detector array with respect to the scene at a first sweep rate based on the first read-out pixel window; and further comprising:
determining a second read-out pixel window comprising a second subset of pixels of the plurality of pixels, the second read-out pixel window configured to detect photons in a second infrared band that is different from the first infrared band and comprising a different number of pixels than the first read-out pixel window;

continuously moving the detector array with respect to the scene at a second sweep rate based on the second read-out pixel window, the second sweep rate being a different sweep rate than the first sweep rate; and reading out the second read-out pixel window.

\* \* \* \* \*